United States Patent
Dujardin et al.

(10) Patent No.: US 6,940,921 B2
(45) Date of Patent: Sep. 6, 2005

(54) MULTIMODULE DEVICE WITH STATIC BEHAVIOR

(75) Inventors: Eric Dujardin, Paris (FR); Olivier Gay-Bellile, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 761 days.

(21) Appl. No.: 09/855,580

(22) Filed: May 15, 2001

(65) Prior Publication Data

US 2002/0039392 A1 Apr. 4, 2002

(51) Int. Cl.$^7$ ................................. H04L 27/06
(52) U.S. Cl. ....................................... 375/316
(58) Field of Search ................. 375/316, 350; 348/665, 666; 712/226, 209; 725/32, 39

(56) References Cited

U.S. PATENT DOCUMENTS 5,768,539 A * 6/1998 Metz et al. ................. 709/249
5,949,410 A * 9/1999 Fung ......................... 715/500.1
6,157,997 A * 12/2000 Oowaki et al. ............. 712/226
6,519,371 B1 * 2/2003 Pain et al. .................. 382/288

* cited by examiner

Primary Examiner—Khai Tran
(74) Attorney, Agent, or Firm—Michael E. Belk

(57) ABSTRACT

A device provides a normally static and nevertheless programmable architecture, for example, a programmable digital demodulator. The device includes a first and a second processor module. The second module receives data and instructions and executes operations for obtaining a result. The first module transmits instructions to the second module according to a predetermined scheme, each instruction indicating the operation it is provided to execute in the current time slot. An operation is only executed by the second module if the necessary data are available. It is not possible to execute a different operation from the one that is provided in the current time slot. Thus, no result can be delivered outside the time slots provided for this purpose.

8 Claims, 2 Drawing Sheets

MULTIMODULE DEVICE WITH STATIC BEHAVIOR

FIELD OF THE INVENTION

The invention relates to a device comprising at least a first and a second module, said first module being intended to supply instructions to said second module, and said second module being intended to receive data and to perform at least one function that necessitates the execution of a succession of operations so as to produce a result based on a plurality of received data.

The invention also relates to a demodulator comprising such a device, a television receiver comprising such a demodulator, and a transmission system comprising such a receiver.

BACKGROUND OF THE INVENTION

European patent application no. 0340978 A2 describes a modulator/demodulator device which comprises three modules. The first module performs a function of echo canceler on received samples. The second module performs a function of demodulation on samples that are transmitted thereto by the first module. Finally, the third module acts as a controller. It triggers the operations of the first and second module, and it serves as an intermediary for the exchanges of data, notably from the first module to the second module. It is also this third module that receives the data delivered by the second module so as to relay them to user modules.

SUMMARY OF THE INVENTION

The invention relates to a device of a different type in which the first module is not involved in the transmission of the data. More particularly, when a second module produces results intended for another module, these results are transmitted directly.

Generally, to facilitate the validation of this type of device and thus to diminish the cost of development, it is desirable to predefine time slots in which the results must be produced. Besides, to optimize the operation of the device, it is desirable to minimize the number of time slots provided for delivering the results.

The definition of time windows provided for the delivery of the results notably poses a problem when various data are to be received to produce a result, and when there is uncertainty about the reception of these data.

It is a first object of the invention to provide a solution to this problem. This object is achieved with a device according to the invention as described in the opening paragraph and characterized in that:

said first module is arranged for supplying said instructions to the second module in predefined time windows, said instructions containing at least one operation indication, said second module comprises an operation counter intended to indicate the next operation to be executed, and a data counter intended to count the received unused data, and said second module is arranged for executing a received instruction only if the operation indication contained in the received instruction coincides with the next operation to be executed such as indicated by its operation counter, and if its data counter indicates that the data necessary for the execution of this operation are available.

In accordance with the invention, the instructions are thus sent in accordance with a predefined schedule, and the instruction indicates the operation that is planned to be executed in the current time window. The operation is not executed if the necessary data are not available. Furthermore, the invention no longer permits to execute an operation that is different from that planned for the current time window. More particularly, it is not possible to deliver a result if the operation planned for the current time window is not an operation that leads to the delivery of a result.

Besides, in this type of device it is also desirable for simplifying the validation of the device, that the second module delivers a result in each of the time windows provided for this purpose, whether or not it has received the data necessary therefor.

This object is achieved with a device according to the invention, characterized in that said second module is arranged for producing in predefined time windows results associated to a result validity indicator, the result validity indicator being in an "invalid" state when no result is available.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF PREFERRED EMBODIMENT(S) OF THE INVENTION

Figure 1:
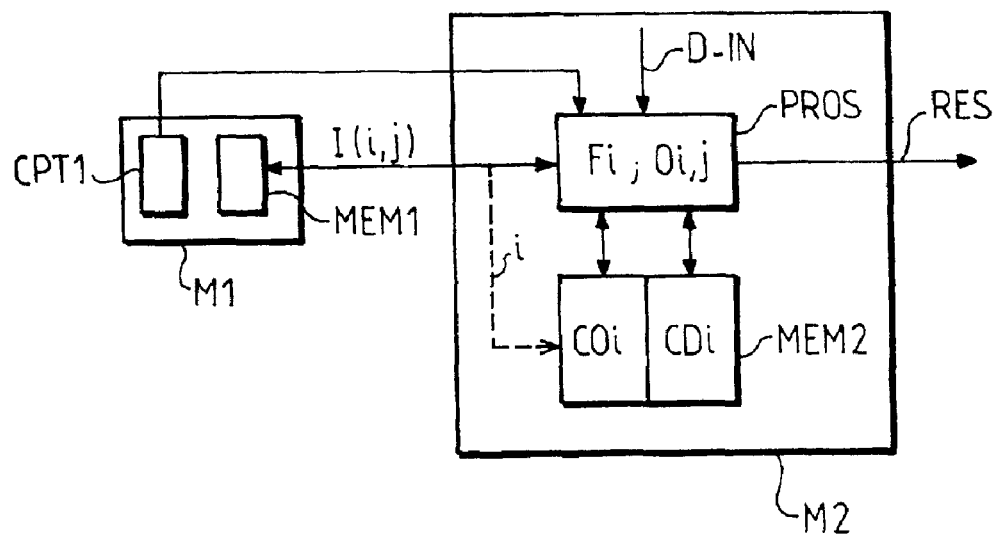
FIG. 1 is a diagram describing an example of architecture of a device according to the invention.

In FIG. 1 is represented an example of a device according to the invention. This device comprises a first and a second module M1 and M2. The first module M1 is intended to supply instructions I to the second module M2, in predetermined time windows. By way of example, the first module M1 comprises a memory MEM1 for storing the instructions, and a counter CPT1 which indicates a location to be read from the memory MEM1 and which is incremented with each new time window. The second module M2 is intended to receive data D-IN and to perform the functions $F_i$ which necessitate the execution of a succession of operations $O_{i,j}$. With each new time window, the module M2 reads an instruction from the memory MEM1 of the first module M1. In this example of embodiment, an instruction I contains an function indication i, and an operation indication j. The second module M2 comprises a memory MEM2 in which are notably stored for each function i an operation counter $CO_i$ and a data counter $CD_i$. The operation counter $CO_i$ has for its function to indicate where the second module is in the succession of operations $O_{i,j}$ to be executed to perform the function i. For example, this counter indicates the next operation to be executed and it is updated each time an operation is executed. The data counter $CD_i$ has for its function to indicate whether the data necessary for the execution of an operation are available or not. For example, the data counter $CD_i$ is incremented by unity each time a data D-IN is received, and decremented by unity each time a data is consumed. The values of the operation counter $CO_i$ and of the data counter $CD_i$ are transmitted to a processing entity PROS which decides to execute or not the received instruction I. The processing entity PROS delivers results RES.

Figure 2:
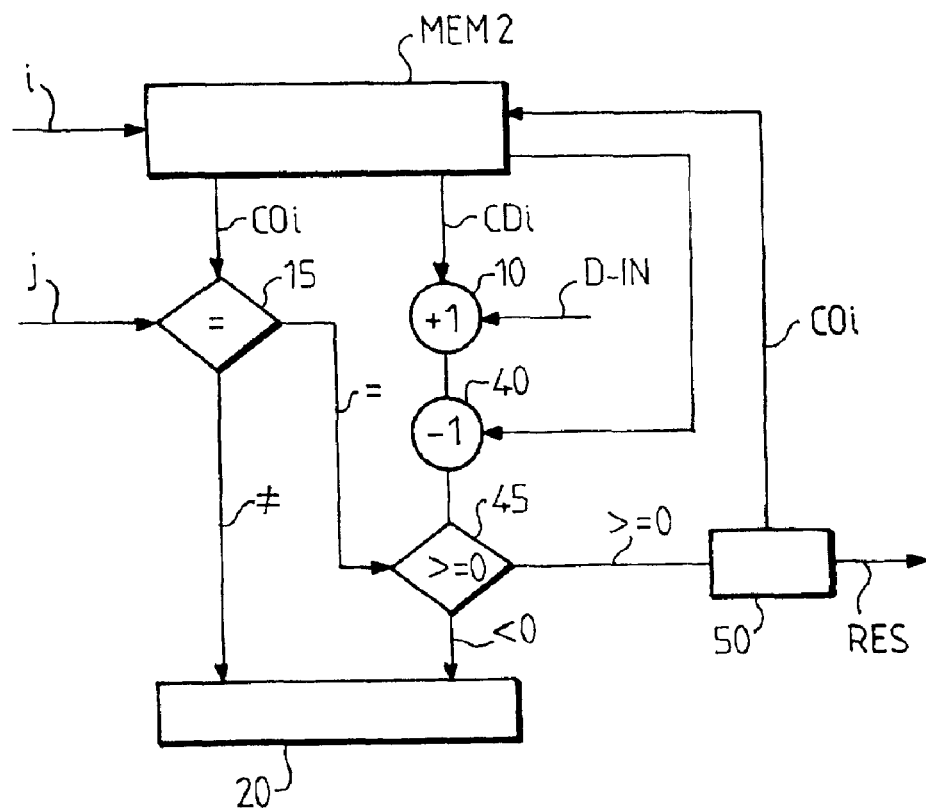
FIG. 2 is a diagram explaining the operation of a second module within the meaning of the invention.

In FIG. 2 is represented a diagram explaining the processes carried out by the processing entity PROS when it receives function indication i and operation indication j. When it receives a data D-IN, it increments the data counter $CD_i$ by unity, which is stored in the memory MEM2 (box 10).

It reads the value of the operation counter $CO_i$ from the memory MEM2 and compares it with the received operation indication j (box 15). If the value of the operation counter $CO_i$ does not correspond to the received operation indication j, the instruction I is not executed (box 20). If the contents of the operation counter $CO_i$ correspond to the received operation indication j, the processing entity verifies whether the data necessary for the execution of the operation j are available.

Therefore, the processing entity PROS determines whether the execution of the operation j causes one data to be consumed (that is to say, if it is necessary that one data is available for the operation j to be executed). This information is stored, for example, in the memory MEM for each operation j. If the execution of the operation j causes one data to be consumed, the data counter $CD_i$ is decremented by unity (box 40). Then the processing entity tests the value of the data counter (box 45). If it is positive or zero, the instruction is executed (box 50).

When the operation has been executed, the operation counter $CO_i$ is updated. This updating consists of decrementing the operation counter, then testing the value thereof. If the value is negative, this means that all the operations $O_{i,j}$ relating to the function i have been executed. The operation counter is reinitialized at its initial value (that is to say, at the number of operations to be executed to perform the function i, minus one).

Now will be described with respect to Tables I and II the operation of the device according to the invention in a particular case. The particular case chosen by way of example is the case where the second module M2 performs the digital filter function for dividing input data by two.

Generally, decimation filters are filters for which the rate of the results on the output is lower than the rate of the input data. The equation of such a filter may be written as:

$$y(n) = \sum_{k=0}^{L-1} x(dn-k) \cdot w_k \quad (1)$$

where y(n) are the results produced on the output of the filter, x(dn-k) are the data received on the input, $w_k$ are the filter coefficients, L is the length of the filter and d is the decimation factor of the filter. For producing a result on the output of the filter, L elementary calculations have to be carried out consisting each of a multiplication and an addition. In the example that will be described, it is considered that L/4 elementary calculations of this type could be carried out in one time window, that is to say, that an operation in the sense of the present invention comprises L/4 elementary calculations of this type. Moreover, the case is considered of a decimation by 2 (d=2). By referring to the equation (1), it is thus found that two data x(2n-1) and x(2n) are to be received on the input to be able to produce a result y(n) on the output.

In the Table I is represented the operation of the device as it is planned.

TABLE I

| Time window | Received data | Operation to be executed | Produced result |
|---|---|---|---|
| $t_0$ | | $c_0$ | |
| $t_1$ | | $c_1$ | |
| $t_2$ | $D_0$ | $c_2$ | |
| $t_3$ | | | |
| $t_4$ | | | |
| $t_5$ | $D_1$ | $c_3$ | $R_0$ |
| $t_6$ | | $c_0$ | |
| $t_7$ | | $c_1$ | |
| $t_8$ | $D_2$ | $c_2$ | |
| $t_9$ | | | |
| $t_{10}$ | | | |
| $t_{11}$ | $D_3$ | $c_3$ | $R_1$ |
| $t_{12}$ | | $c_0$ | |
| $t_{13}$ | | $c_1$ | |
| $t_{14}$ | $D_4$ | $c_2$ | |
| $t_{15}$ | | | |
| $t_{16}$ | | | |
| $t_{17}$ | $D_5$ | $c_3$ | $R_2$ |

As indicated in the Table I:

the decimation necessitates the execution of four operations $c_0$, $c_1$, $c_2$ and $c_3$ to obtain a result $R_n$ where n is a natural integer; the operations $c_0$ and $c_1$ do not consume data; in contrast, the operations $c_2$ and $c_3$ consume one each;

instructions are read by the module M2 from the memory MEM1 of the module M1 in predetermined time windows $t_{6n}$, $t_{6n+1}$, $t_{6n+2}$ and $t_{6n+5}$;

one input data is received in each time window $t_{3n+2}$;

a result $R_n$ is generated in a predetermined time window $t_{6n+5}$ based on two input data $D_{2n}$ and $D_{2n+1}$.

The Table I represents the operation of a device according to the invention when all the data are supplied in the time windows that are planned, that is to say, in the time windows $t_{3n+2}$.

However, it may happen that one or more data are not received as planned.

Figure 3:
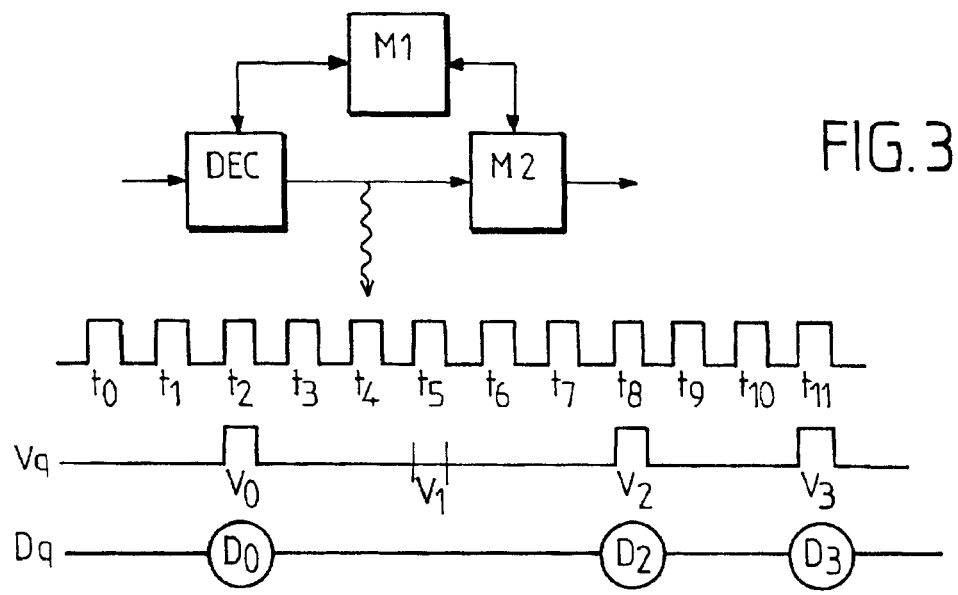
FIG. 3 is a diagram of another example of a device according to the invention.

In FIG. 3 is shown by way of example a device according to the invention, in which one or more of the data indicated in the Table I are not received by the second module M2. The device of FIG. 3 comprises an additional module DEC upstream of the second module (this may be, for example, a decimation module). In certain time windows $t_{3n+2}$, the module DEC produces no result at all. However, it supplies a data $D_q$ to the module M2 in each time window $t_{3n+2}$, by associating a validity indicator $V_q$ to each data $D_q$. When the module DEC does not produce any result (this is the case in the time window $t_5$ in FIG. 3), the validity indicator is put to the <<invalid>> state ($V_q=0$). And when the module M2 receives a data associated to an invalid indicator, it interprets this data as being not received, that is to say, the module does not take this into account. In contrast, when the module DEC does produce a result (this is the case in the time windows $t_2$, $t_8$, $t_{11}$ in FIG. 3), the validity indicator is put to the <<valid>> state ($V_q=1$). And when the module M2 receives a data $D_q$ associated to a valid indicator, the module M2 utilizes said data.

TABLE II

| Time window | Received data | Received operation indication | $CO_i$ | $CD_i$ | Produced result |
|---|---|---|---|---|---|
| $t_0$ | | $c_0$ (j=3) | 3->2 | 0 | |
| $t_1$ | | $c_1$ (j=2) | 2->1 | 0 | |
| $t_2$ | $D_0$ | $c_2$ (j=1) | 1->0 | +1-1=0 | |
| $t_3$ | | | 0 | 0 | |
| $t_4$ | | | 0 | 0 | |
| $t_5$ | | $c_3$ (j=0) | 0 | 0 | |
| $t_6$ | | $c_0$ (j=3) | 0 | 0 | |
| $t_7$ | | $c_1$ (j=2) | 0 | 0 | |
| $t_8$ | $D_2$ | $c_2$ (j=1) | 0 | +1 | |
| $t_9$ | | | | +1 | |
| $t_{10}$ | | | | +1 | |
| $t_{11}$ | $D_3$ | $c_3$ (j=0) | 0->3 | +1+1-1=+1 | $R_1$ |
| $t_{12}$ | | $c_0$ (j=3) | 3->2 | +1 | |
| $t_{13}$ | | $c_1$ (j=2) | 2->1 | +1 | |
| $t_{14}$ | $D_4$ | $c_2$ (j=1) | 1->0 | +1+1-1=+1 | |
| $t_{15}$ | | | | +1 | |
| $t_{16}$ | | | | +1 | |
| $t_{17}$ | $D_5$ | $c_3$ (j=0) | 0->3 | +1+1-1=+1 | $R_2$ |

In the Table II is represented the operation of a device according to the invention when a data is not received (the data $D_1$ in the described example). The first module M1 supplies instructions I to the second module M2 in each planned time window, that is to say, in the time windows $t_{6n}$, $t_{6n+1}$, $t_{6n+2}$ and $t_{6n+5}$.

At the first instant the operation counter $CO_i$ associated to the processed function is equal to 3, as 4 operations are necessary to obtain a result. And the data counter $CD_i$ associated to this same function is initialized at the zero value.

In the time window $t_2$, the module M2 receives a data $D_0$ and an instruction I containing an operation indication equal to 1 (which corresponds to the operation $c_2$). The operation counter $CO_i$ is also equal to 1, as two operations $c_0$ and $c_1$ have already been executed in the respective time windows $t_0$ and $t_1$. The data counter $CD_i$ is incremented by unity because one data is received ($CD_i$=+1). As one data is necessary for the execution of the operation $c_2$, the counter is then decremented by unity, so that it finally has the zero value ($CD_i$=0). The instruction is thus carried out after which the operation counter $CO_i$ is decremented by unity ($CO_i$=0).

In the time window $t_5$, the data $D_1$ is not received. But the module M2 nevertheless receives an instruction I containing an operation indication equal to zero (which corresponds to the operation $c_3$ that would normally have to be executed in the time window $t_5$). Establishing that one data is necessary for the execution of the operation $c_3$, the module M2 decrements the data counter $CD_i$ by unity. The counter $CD_i$ thus adopts the value −1. A the data necessary for executing the operation $c_3$ are not available, the received instruction is not executed.

In the time window $t_8$, the module M2 receives a data $D_2$ and an instruction that contains an operation indication equal to 1 (as indicated in table I it is the execution of the operation $c_2$ that is planned in the time window $t_8$). The data counter $CD_i$ is thus incremented by unity ($CD_i$=0). But as the received operation indication (1) is not equal to the value of the operation counter $CO_i$ ($CO_i$=0), the instruction is not executed. No result will thus be delivered in the time window $t_8$ (it may be noticed from table I that it is not planned to deliver a result in the time window $t_8$).

In the time window $t_{11}$, the module M2 receives a data $D_3$ and an instruction that contains an operation indication equal to 0 (operation $c_3$). The data counter $CD_i$ is thus incremented by unity ($CD_i$=+1). The operation indication contained in the received instruction is equal to the value of the operation counter. As the execution of the operation $c_3$ causes one data to be consumed, the data counter $CD_i$ is decremented by unity ($CD_i$=0), after which the instruction is carried out. It produces a result $R_1$. The operation counter $CD_i$ is then reinitialized at the value 3.

Thus, the result $R_1$ is produced in the time window $t_{11}$ which, as indicated in the Table, I, is one of the time windows in which it is planned to deliver a result when all the data are received in the planned time windows.

To particularly refer to the importance of the invention, Table III shows the operation that could be obtained, when the data $D_1$ is not received, if the invention were not applied.

TABLE III

| Time window | Received data | Operation to be executed | Produced result |
|---|---|---|---|
| $t_0$ | | $c_0$ | |
| $t_1$ | | $c_1$ | |
| $t_2$ | $D_0$ | $c_2$ | |
| $t_3$ | | | |
| $t_4$ | | | |
| $t_5$ | | | |
| $t_6$ | | | |
| $t_7$ | | | |
| $t_8$ | $D_2$ | $c_3$ | $R_0$ |
| $t_9$ | | $c_0$ | |
| $t_{10}$ | | $c_1$ | |
| $t_{11}$ | $D_3$ | $c_2$ | |
| $t_{12}$ | | | |
| $t_{13}$ | | | |
| $t_{14}$ | $D_4$ | $c_3$ | $R_1$ |
| $t_{15}$ | | $c_0$ | |
| $t_{16}$ | | $c_1$ | |
| $t_{17}$ | $D_5$ | $c_2$ | |

In the time window $t_8$, the module M2 would receive a data $D_2$ and an instruction in view of the execution of the next operation. The module M2 would thus execute the next operation $c_3$ and deliver a result $R_0$ in the time window $t_8$, that is to say, outside time windows planned for the delivery of the results. Then, the module would deliver a result $R_1$ in the time window $t_{14}$, and so on and so forth.

Two solutions are then possible to cope with this situation. The first solution consists of storing the results produced at shifted instants in a memory, and to use a program for managing the reading of the results at the desired moment. This solution is too complex to be used in devices that include various second modules, with data transfers to be managed between these various second modules. More particularly the validation of the operation of the device may turn out to be very complex in that case. The second solution consists of doubling the provided time windows to produce the results. In effect, if one decides to define in advance the time windows provided for delivering the results, the fact that the results may be produced in the time windows $t_{6n+5}$ is to be taken into account if no data is lacking, but also the time windows $t_{6n+8}$ if one data is not received. Finally, twice the number of time windows are thus to be provided for the delivery of the results. This is very costly in terms of resources.

Thanks to the invention the results are produced in the same time windows when the input data are received by the second module and when they are not received by the second module. Thus, the number of time windows to be provided for the delivery of the result is restricted to the necessary minimum.

When reference is made to Table II, it is found that in the embodiment of the invention that has just been described, no result whatsoever is delivered in the time window $t_5$, whereas the time window $t_5$ is a time window in which it is planned to deliver a result. It may be advantageous for the second module to deliver a result in each of the time windows in which it is planned to do so. In an advantageous embodiment, the second module M2 thus produces a result $R_n$ in each of the time windows $t_{6n+5}$ where it is planned to deliver a result, by associating to said result a result validity indicator $V'_n$. The result validity indicator is in an <<invalid>> state when no result is available, and in a <<valid>> state when a result is available. Thus, the module which uses the produced results will be able to determine whether a result transmitted in a predetermined time window is valid or invalid, that is to say, usable or not usable.

Devices according to the invention can be used, for example, to make programmable digital demodulators.

Figure 4:
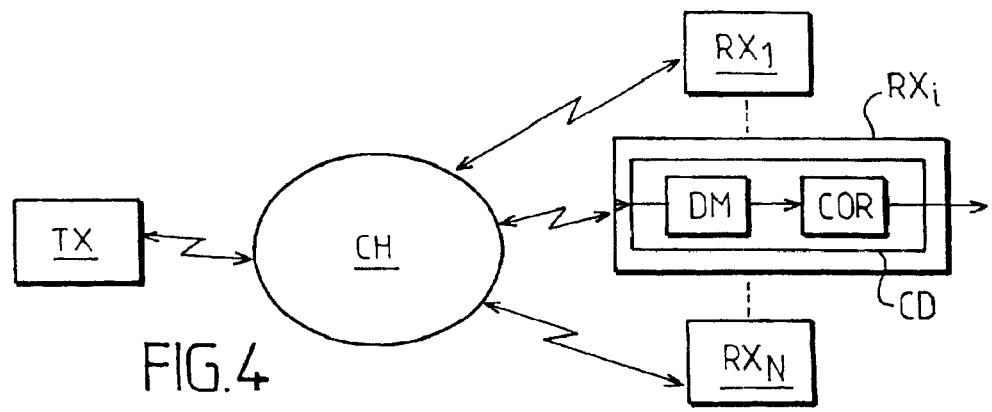
FIG. 4 is a diagram of an example of a transmission system according to the invention.

In FIG. 4 is shown an example of a digital data transmission system according to the invention. It comprises a transmitter TX, a transmission channel CH and a plurality of receivers $RX_1, \ldots RX_N$. The transmissions take place, for example, by satellite, by cable or by radio channel. In all the cases the receivers conventionally comprise a channel decoding device CD which contains a digital demodulator DM and a decoding device for decoding error correcting codes COR. But the sampling frequencies and the characteristic features of the demodulation differ depending on the channel used.

It is thus interesting to develop a programmable structure which permits to realize various types of digital demodulators.

A large part of the demodulation functions is carried out thanks to a succession of filters. This is the case, for example, with the generation of the base band modulated, the anti-aliasing filtering, interpolation, Nyquist filtering and equalization.

To realize a programmable structure dedicated to the demodulation, it is thus advantageous to have a programmable module dedicated to the filtering. Such a module has been proposed, for example, by KPENV in European patent application published under No. 0926823-A1. The programmable module proposed in this patent application is provided for calculating various filters, each filter calculation calling forth the execution of various operations. The invention is applicable, for example, to a device comprising one or various second modules formed by programmable modules of this type.

Figure 5:
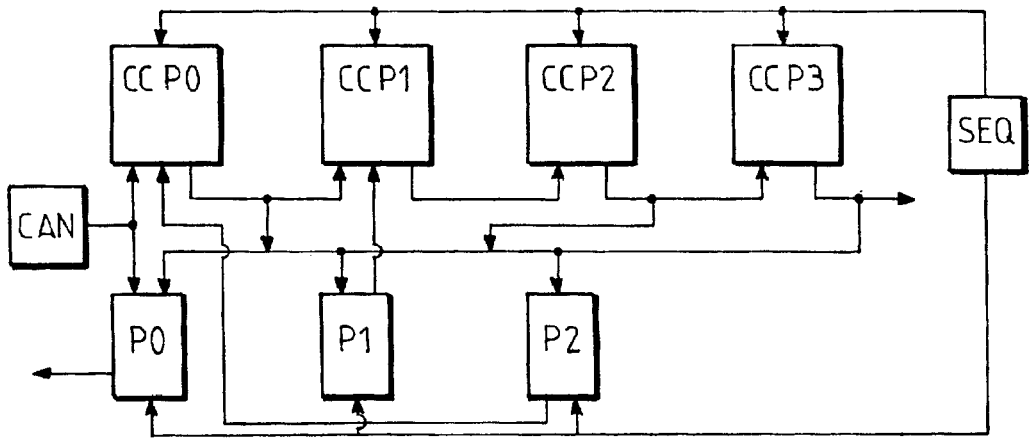
FIG. 5 is a diagram of an example of a digital demodulator according to the invention.

By way of example is represented in a diagrammatic form in FIG. 5 a digital demodulator for satellite transmissions. This digital demodulator comprises:

an analog-to-digital converter CAN which receives input data, a direct chain comprising four programmable filter modules CCP0 to CCP3 such as described in European patent application no. 0926823-A1, which play the role of second modules within the meaning of the invention, and which perform the following functions: generation of the baseband signal, anti-aliasing filtering, filtering via interpolation, Nyquist filtering and multiplication, a return path comprising three co-processors P0 to P2, which perform the following respective functions: automatic gain control, clock recovery and carrier recovery, a sequencer SEQ, which controls the four programmable filter modules and the four co-processors (and which thus plays the role of first module within the meaning of the invention).

These elements are interconnected via an interconnection network INT, so that notably:

the output data of the analog-to-digital converter CAN are brought to the input of the first filter module CCP0, on the one hand, and to the input of the co-processor P0 which is dedicated to the automatic gain control, on the other, the filter modules can pass on results to each other in an appropriate manner depending on the spreading of the various filter functions over the various filter modules, the output of the co-processor P2, which is dedicated to the carrier recovery, is brought to the input of the filter module dedicated to the baseband translation (CCP0 in the Figure), the output of the co-processor P1, which is dedicated to the clock recovery, is brought to the input of the first filter module in charge of the interpolation (CCP1 in the Figure).

The invention has other applications than that which has just been described with reference to the FIGS. 4 and 5. In a general way a device according to the invention may be advantageously used in all the cases where a programmable and nevertheless static architecture is needed, that is to say, where the exchange of data takes place, in accordance with a pre-established scheme whatever the programming mode of the device.

What is claimed is:

1. A device comprising at least a first module and a second module, said first module being intended to supply instructions to said second module, and said second module being intended to receive data and to perform at least one function that necessitates the execution of a succession of operations so as to produce a result based on a plurality of received data, characterized in that:

said first module is arranged for supplying said instructions to the second module in predefined time windows, said instructions containing at least one operation indication, said second module comprises an operation counter intended to indicate the next operation to be executed, and a data counter intended to count the received data, and said second module is arranged for executing a received instruction only if the operation indication contained in the received instruction coincides with the next operation to be executed such as indicated by its operation counter, and if its data counter indicates that the data necessary for the execution of this operation are available.

2. A device as claimed in claim 1, characterized in that the second module is intended to receive data in predefined time windows, said data being associated to indicator of data validity which is in a valid state when the data can be used by the second module, and in an invalid state when the data cannot be used by the second module.

3. A device as claimed in claim 1, characterized in that said second module is arranged for producing, in predefined time windows, results associated to a result validity indicator, the result validity indicator being in an invalid state when no result at all is available.

4. A device as claimed in claim 1, characterized in that said second module, which is intended to perform a plurality of additional functions, comprises an additional data counter and an additional operation counter for each of said additional functions, and in that the instructions produced by said first module contain a function indicator which permits the second module to determine the data counter and the operation counter to be used for deciding the execution or not of an instruction.

5. A device as claimed in claim 1, characterized in that it comprises a plurality of second modules connected so that results produced by at least one second module form the data received by another second module.

6. A programmable demodulator comprising a device a claimed in claim 1.

7. A receiver comprising a programmable demodulator as claimed in claim 6.

8. A transmission system comprising at least a transmitter and a receiver as claimed in claim 7.

* * * * *